United States Patent
Li et al.

(10) Patent No.: US 10,181,907 B2
(45) Date of Patent: Jan. 15, 2019

(54) METHOD AND APPARATUS FOR ESTIMATING POLARIZATION DEPENDENT LOSS AND RECEIVING DEVICE

(71) Applicant: Fujitsu Limited, Kawasaki-shi, Kanagawa (JP)

(72) Inventors: Huihui Li, Beijing (CN); Ying Zhao, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/720,620

(22) Filed: Sep. 29, 2017

(65) Prior Publication Data

US 2018/0123700 A1    May 3, 2018

(30) Foreign Application Priority Data

Oct. 31, 2016  (CN) .......................... 2016 1 0930440

(51) Int. Cl.
| | |
|---|---|
| *H04B 10/61* | (2013.01) |
| *H04J 14/06* | (2006.01) |
| *H04B 10/079* | (2013.01) |
| *H04B 10/2507* | (2013.01) |

(52) U.S. Cl.
CPC ..... *H04B 10/6162* (2013.01); *H04B 10/0795* (2013.01); *H04B 10/2572* (2013.01); *H04B 10/6166* (2013.01); *H04J 14/06* (2013.01)

(58) Field of Classification Search
CPC ............ H04B 10/6162; H04B 10/6166; H04B 10/2572; H04B 10/0795; H04J 14/06
See application file for complete search history.

(56) References Cited

U.S. PATENT DOCUMENTS 9,369,213 B1 * 6/2016 Kakande ............ H04B 10/6166
2011/0268459 A1   11/2011 Rollins et al.
(Continued)

FOREIGN PATENT DOCUMENTS

| CN | 103954435 A | 7/2014 |
| CN | 104348544 A | 2/2015 |
| CN | 104410456 A | 3/2015 |

OTHER PUBLICATIONS

Ding et al., "Measurement of Polarization Dependent Loss by Two SOPs" *ACTA Photonica Sinica*, vol. 36 No. 12; Dec. 2007; pp. 2281-2283.

*Primary Examiner* — Leslie C Pascal
(74) *Attorney, Agent, or Firm* — Staas & Halsey LLP

(57) ABSTRACT

Embodiments of this disclosure provide a method and apparatus for estimating polarization dependent loss (PDL) and a receiving device. The method includes: performing equalization processing on pre-processed dual-polarization state signals; performing correlation operations on the equalized dual-polarization state signals and unequalized dual-polarization state signals; constructing an estimation matrix based on a result of the correlation operations; and calculating a polarization dependent loss of the dual-polarization state signals by using one or more feature values of the estimation matrix. Hence, not only PDL in an optical fiber link may be accurately estimated, but also off-line digital signal processing may be performed at a receiver, without needing to incur extra hardware overhead.

9 Claims, 8 Drawing Sheets

(56) References Cited

U.S. PATENT DOCUMENTS

| | | | |
|---|---|---|---|
| 2012/0216093 A1* | 8/2012 | Djordjevic | H03M 13/1171 714/755 |
| 2014/0212149 A1 | 7/2014 | Khandani et al. | |
| 2015/0304025 A1 | 10/2015 | Liu et al. | |

* cited by examiner

METHOD AND APPARATUS FOR ESTIMATING POLARIZATION DEPENDENT LOSS AND RECEIVING DEVICE

CROSS-REFERENCE TO RELATED APPLICATIONS

This application claims the benefit of Chinese Application No. 201610930440.6, filed Oct. 31, 2017, in the Chinese Intellectual Property Office, the disclosure of which is incorporated herein by reference.

TECHNICAL FIELD

This disclosure relates to the field of optical communication technologies, and in particular to an apparatus and method for estimating polarization dependent loss (PDL) and a receiving device.

BACKGROUND

As development of optical fiber communication technologies, higher optical fiber transmission capacities are demanded. Currently, a system transmission capacity of an optical fiber communication system is mainly improved by using a polarization multiplexing technology, which, by loading different modulation signals in two orthogonal polarization states (H polarization state and V polarization state), may double the system transmission capacity without increasing a bandwidth.

However, for a high-speed optical fiber communication system of polarization multiplexing, damages in the optical fiber links, such as polarization mode dispersion (PMD) and polarization dependent loss (PDL), brought about by some effects related to the polarization states, must be taken into account in long-haul transmission, such effects posing non-negligible influence on performance of the optical fiber communication.

The PMD in an optical fiber makes that signals are propagated forward at different speeds in the two polarization states, thereby making pulses widened and system performance degraded. And PDL in an optical fiber refers to a ratio of maximum transmission power $P_{max}$ to minimum transmission power $P_{min}$ of the optical fiber in all possible polarization states, which may be expressed as follows:

$$PDL = 10\log_{10}\frac{P_{max}}{P_{min}}. \qquad \text{formula 1}$$

Hence, the PDL in the optical fiber will result in changes of optical power and signal to noise ratios in the two polarization states, thereby seriously affecting the performance of the polarization multiplexing system. In order to improve the performance of the polarization multiplexing system, the PDL in the optical fiber link needs to be accurately estimated.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

Embodiments of this disclosure provide an apparatus and method for estimating polarization dependent loss (PDL) and a receiving device, in which PDL in an optical fiber link may be accurately estimated by digital signal processing (DSP) at a receiver.

According to a first aspect of the embodiments of this disclosure, there is provided an apparatus for estimating polarization dependent loss, configured in a receiving device receiving dual-polarization state signals, the apparatus includes:

an equalizer configured to perform equalization processing on pre-processed dual-polarization state signals;

a correlator configured to perform correlation operations on the equalized dual-polarization state signals and unequalized dual-polarization state signals;

a constructor configured to construct an estimation matrix based on a result of the correlation operations; and a calculator configured to calculate a polarization dependent loss of the dual-polarization state signals by using one or more feature values of the estimation matrix.

According to a second aspect of the embodiments of this disclosure, there is provided a method for estimating polarization dependent loss, applicable to a receiving device receiving dual-polarization state signals, the method includes:

performing equalization processing on pre-processed dual-polarization state signals;

performing correlation operations on the equalized dual-polarization state signals and unequalized dual-polarization state signals;

constructing an estimation matrix based on a result of the correlation operations; and calculating a polarization dependent loss of the dual-polarization state signals by using one or more feature values of the estimation matrix.

According to a third aspect of the embodiments of this disclosure, there is provided a receiving device, the receiving device includes:

an optical-to-electrical converter configured to convert received dual-polarization state optical signals into electrical signals; and a digital signal processor configured to perform equalization processing on pre-processed dual-polarization state signals, perform correlation operations on the equalized dual-polarization state signals and unequalized dual-polarization state signals, construct an estimation matrix based on a result of the correlation operations, and calculate a polarization dependent loss of the dual-polarization state signals by using one or more feature values of the estimation matrix.

An advantage of the embodiments of this disclosure exists in that at a receiver, correlation operations are performed on the equalized dual-polarization state signals and unequalized dual-polarization state signals, and an estimation matrix is constructed based on a result of the correlation operations. Hence, not only PDL in an optical fiber link may be accurately estimated, but also off-line digital signal processing may be performed at the receiver, without needing to incur extra hardware overhead.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

Figure 1:
FIG. 1 is a schematic diagram of modeling a PDL in an optical transmission link of an embodiment of this disclosure.

In this disclosure, in order to estimate PDL at a receiver, PDL in an optical fiber link may be modeled. FIG. 1 is a schematic diagram of modeling a PDL in an optical transmission link of an embodiment of this disclosure, in which total PDL modeling in an optical fiber is shown.

As shown in FIG. 1, a polarization rotation matrix 1 may be denoted by Rotator1, PDL denotes polarization dependent loss, and a polarization rotation matrix 2 may be denoted by Rotator2. A polarization rotation matrix is related to an angle of polarization rotation, and a rotation matrix Rotator determined by the angle θ of polarization rotation may be expressed as:

$$\text{Rotator} = \begin{bmatrix} \cos\theta & \sin\theta e^{j\delta} \\ -\sin\theta e^{-j\delta} & \cos\theta \end{bmatrix}; \quad \text{formula 2}$$

where, δ denotes phase time delay between two polarization states. It can be seen from formula 2 that the polarization rotation matrix is a 2×2 unitary matrix. As shown in formula 2, the matrix of the PDL modeling may be applied to a complex domain, not limited to a real domain only.

According to the PDL modeling in the optical fiber in FIG. 1, a PDL effect in the optical fiber transmission link may be expressed by a matrix P:

$$P = \begin{bmatrix} \cos\theta_2 & \sin\theta_2 e^{j\delta 2} \\ -\sin\theta_2 e^{j\delta 2} & \cos\theta_2 \end{bmatrix} \times \begin{bmatrix} 1 & 0 \\ 0 & a \end{bmatrix} \times \begin{bmatrix} \cos\theta_1 & \sin\theta_1 e^{j\delta 1} \\ -\sin\theta_1 e^{j\delta 1} & \cos\theta_1 \end{bmatrix}; \quad \text{formula 3}$$

where, a matrix denoted by $\theta_1$ and $\delta_1$ denotes Rotator1, a matrix denoted by $\theta_2$ and $\delta_2$ denotes Rotator2, and an intermediary diagonal matrix denotes a PDL matrix, in which a denotes a value of the PDL to be estimated.

The PDL modeling is illustrated above, and embodiments of this disclosure shall be described below.

Embodiment 1

Embodiment 1 of this disclosure provides a method for estimating polarization dependent loss, applicable to a receiving device (or may be referred to as a receiver) receiving dual-polarization state signals.

Figure 2:
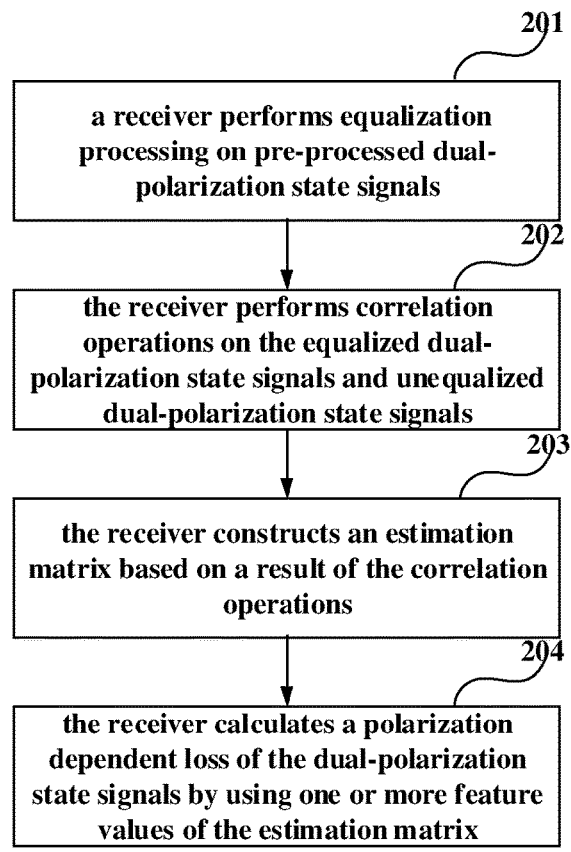
FIG. 2 is a flowchart of the method for estimating polarization dependent loss of Embodiment 1 of this disclosure.

FIG. 2 is a flowchart of the method for estimating polarization dependent loss of the embodiment of this disclosure. As shown in FIG. 2, the method includes:

bock 201: a receiver performs equalization processing on pre-processed dual-polarization state signals;

bock 202: the receiver performs correlation operations on the equalized dual-polarization state signals and unequalized dual-polarization state signals;

bock 203: the receiver constructs an estimation matrix based on a result of the correlation operations; and bock 204: the receiver calculates a polarization dependent loss of the dual-polarization state signals by using one or more feature values of the estimation matrix.

In this embodiment, the receiver may perform pre-process on received signals. The pre-process may include, for example, one or more of the following operations: in-phase quadrature (IQ) imbalance elimination, frequency offset compensation, and phase compensation. However, this disclosure is not limited thereto; for example, other preprocessing operations may also be adopted.

Figure 3:
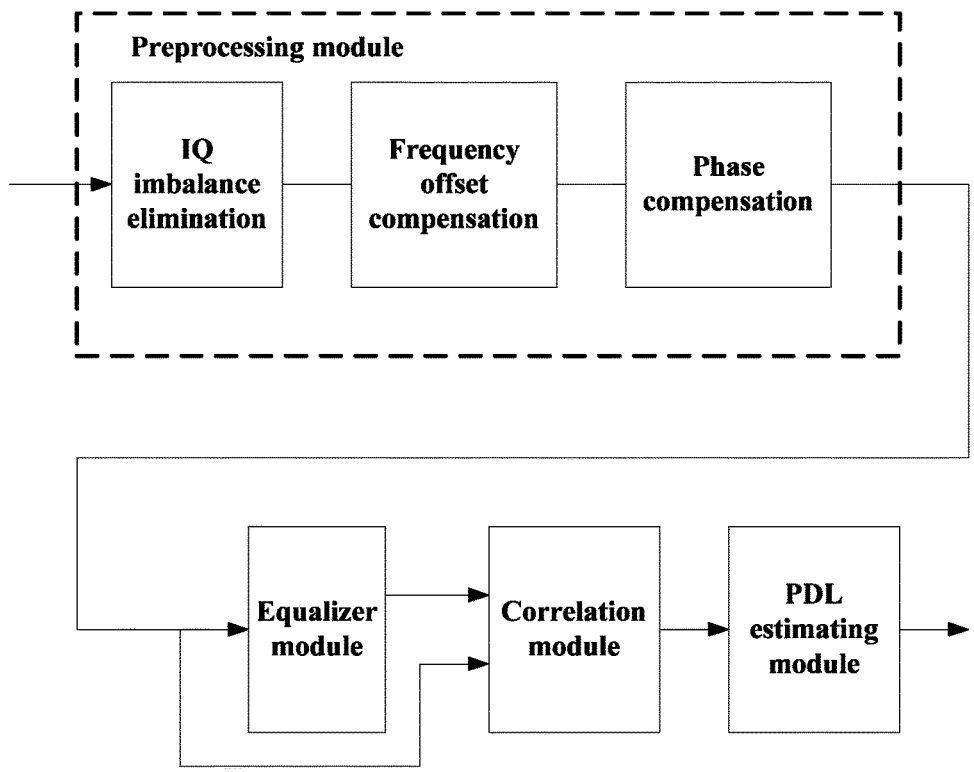
FIG. 3 is a schematic diagram of modules of a receiver of Embodiment 1 of this disclosure.

FIG. 3 is a schematic diagram of modules of a receiver of the embodiment of this disclosure. As shown in FIG. 3, four modules may be included for processing at the receiver: a preprocessing module, an equalizer module, a correlation module and a PDL estimating module. A received signal first passes the preprocessing module which is optional. An aim of preprocessing the received signal is to improve precision of estimation by the subsequent modules. And the preprocessing module, for example, may include three functional units, which are an IQ imbalance eliminating unit, a frequency offset compensating unit and a phase compensating unit.

As shown in FIG. 3, the signal having passed the preprocessing module may enter into the equalizer module, then the signal to be inputted into the equalizer module and the signal outputted from the equalizer module are sent into the correlation module, and finally a correlation result is sent into the PDL estimating module. Hence, the embodiment of this disclosure may accurately estimate the PDL in the receiving device.

The steps shall be further described below.

In this embodiment, the signal having passed the preprocessing module is sent into the equalizer module, and according to an equalizer principle, the equalizer may equalize a nonideal characteristic of a channel. Hence, an operational principle of the equalizer may be expressed by a formula below:

$$\begin{pmatrix} E'_H \\ E'_V \end{pmatrix} = H \times \begin{bmatrix} E_H \\ E_V \end{bmatrix}; \qquad \text{formula 4}$$

where, $E'_H$ denotes a signal in the H polarization state inputted into the equalizer, $E'_V$ denotes a signal in the V polarization state inputted into the equalizer, $E_H$ denotes a signal in the H polarization state outputted by the equalizer, $E_V$ denotes a signal in the V polarization state outputted by the equalizer, and H denotes a response of the channel.

In this embodiment, performing correlation operations on the equalized dual-polarization state signals and unequalized dual-polarization state signals in bock 202 may particularly include: performing inter-correlation operations on the equalized H-polarization state signals and unequalized H-polarization state signals; performing inter-correlation operations on the equalized H-polarization state signals and unequalized V-polarization state signals; performing inter-correlation operations on the equalized V-polarization state signals and unequalized H-polarization state signals; and performing inter-correlation operations on the equalized V-polarization state signals and unequalized V-polarization state signals.

In one implementation, for each inter-correlation operation, following operations may be performed: conjugating a route of signals performing the inter-correlation operation; performing delay on another route of signals performing the inter-correlation operation; multiplying the delayed signals by the conjugated signals, and taking an expected value of a result of multiplication, so as to obtain a correlation value vector.

Figure 4:
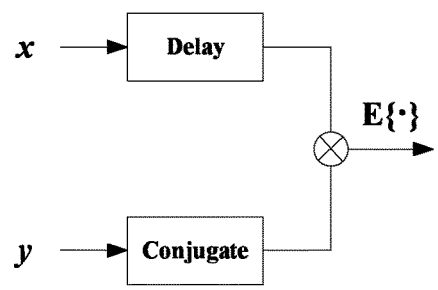
FIG. 4 is a schematic diagram of an inter-correlation operation of Embodiment 1 of this disclosure.

FIG. 4 is a schematic diagram of the inter-correlation operation of the embodiment of this disclosure, in which a case for an inter-correlation operation is shown. As shown in FIG. 4, it is assumed that input signals x and y are both vectors of a length N−1, after being subjected to different delay, signal x is multiplied by a conjugate of signal y, respectively, and $E\{\cdot\}$ denotes an expected value taking operation. By taking an expected value of a product at each delay, inter-correlation values corresponding to different delay may be obtained, and a length of each correlation result is 2×N−1.

Figure 5:
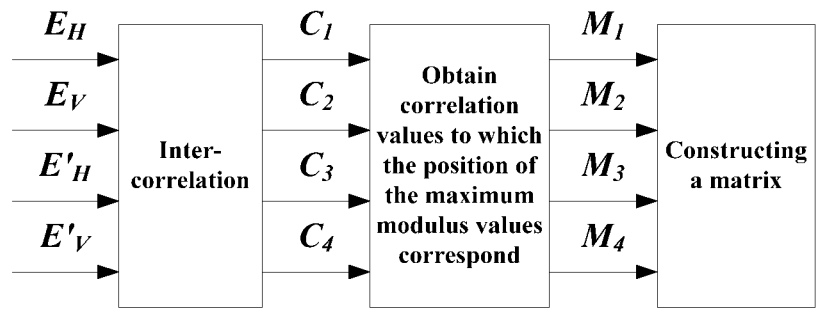
FIG. 5 is a schematic diagram of a correlation operation of Embodiment 1 of this disclosure.

FIG. 5 is a schematic diagram of the correlation operation of the embodiment of this disclosure. As shown in FIG. 5, inter-correlation is performed first on input signals $E'_H$ and $E'_V$ of the equalizer and output signals $E_H$ and $E_V$ of the equalizer, and four groups of correlation value vectors $C_1$, $C_2$, $C_3$ and $C_4$ are calculated by using an inter-correlation algorithm.

$$C_1 = \text{corr}(E'_H, E_H) \qquad \text{formula 5,}$$

$$C_2 = \text{corr}(E'_H, E_V) \qquad \text{formula 6,}$$

$$C_3 = \text{corr}(E'_V, E_H) \qquad \text{formula 7,}$$

$$C_4 = \text{corr}(E'_V, E_V) \qquad \text{formula 8;}$$

where, corr denotes that an inter-correlation operation is performed on two signals.

In this embodiment, for each inter-correlation operation, a position of a maximum modulus value in the correlation value vector may be determined, and a correlation value to which the position of the maximum modulus value corresponds may be obtained. For example, a maximum value of modulus values may be determined for the vector $C_1$ to find a position of the maximum value, and then a correlation value $M_1$ to which the position corresponds is taken.

It should be noted that the above correlation value vectors may be in complex forms, and the correlation values may be obtained after the vectors in complex forms are processed in the above manner. However, this embodiment is not limited thereto; for example, the above correlation value vectors may also be in real forms, that is, they may be expressed as special cases of the complex forms. And correspondingly, a maximum value may be taken for each correlation value vector to obtain a corresponding correlation value.

Hence, the four vectors $C_1$, $C_2$, $C_3$ and $C_4$ may be processed respectively to obtain four values $M_1$, $M_2$, $M_3$ and $M_4$. Magnitudes of the four values are related to a PDL effect in the optical fiber, and a 2×2 estimation matrix A may be constituted by using the four values:

$$A = \begin{bmatrix} M_1 & M_2 \\ M_3 & M_4 \end{bmatrix}. \qquad \text{formula 9}$$

In another implementation, for each inter-correlation operation, following operations may be performed: conjugating a route of signals performing the inter-correlation operation; multiplying two routes of signals performing the inter-correlation operation after aligning them; and obtain a correlation value after taking an expected value of a result of multiplication.

Figure 6:
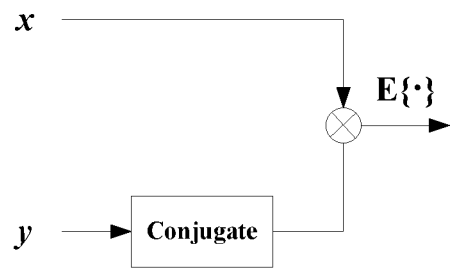
FIG. 6 is another schematic diagram of the inter-correlation operation of Embodiment 1 of this disclosure.

FIG. 6 is another schematic diagram of the inter-correlation operation of the embodiment of this disclosure, in which a case for an inter-correlation operation is shown. As shown in FIG. 6, it is assumed that input signals x and y are both vectors of a length N−1, a conjugate of signal y is multiplied by signal x after aligning them, and $E\{\cdot\}$ denotes an expected value taking operation. Hence, a corresponding inter-correlation may be obtained. An existing method may be used for aligning the signals.

Figure 7:
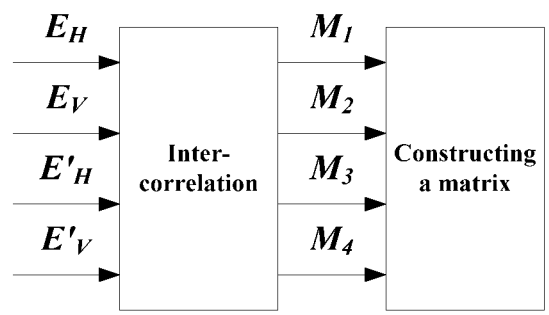
FIG. 7 is another schematic diagram of the correlation operation of Embodiment 1 of this disclosure.

FIG. 7 is another schematic diagram of the correlation operation of the embodiment of this disclosure. As shown in FIG. 7, inter-correlation is performed first on input signals $E'_H$ and $E'_V$ of the equalizer and output signals $E_H$ and $E_V$ of the equalizer, and then four groups of correlation values $M_1$, $M_2$, $M_3$ and $M_4$ are calculated by using an inter-correlation algorithm:

$$M_1 = \text{corr}(E'_H, E_H) \quad \text{formula 10,}$$

$$M_2 = \text{corr}(E'_H, E_V) \quad \text{formula 11,}$$

$$M_3 = \text{corr}(E'_V, E_H) \quad \text{formula 12,}$$

$$M_4 = \text{corr}(E'_V, E_V) \quad \text{formula 13;}$$

where, corr denotes that an inter-correlation operation is performed on two signals.

It should be noted that how to perform inter-correlation operations are illustrated above. However, this disclosure is not limited thereto, and the above particular implementations may be appropriately adjusted or modified. Furthermore, related techniques may be referred to for particular contents of the inter-correlation operations, such as how to perform signal multiplication, and how to take the expected values, etc.

In this embodiment, magnitudes of the four values are related to a PDL effect in the optical fiber, and a 2×2 estimation matrix A may be constituted by using the four values:

$$A = \begin{bmatrix} M_1 & M_2 \\ M_3 & M_4 \end{bmatrix}. \quad \text{formula 9}$$

In this embodiment, the receiver may use the feature values of the estimation matrix to calculate the PDL of the dual-polarization state signals. Following description shall be given by taking singular value decomposition (SVD) as an example. However, this disclosure is not limited thereto; for example, the feature values of the estimation matrix may be directly calculated, and then the feature values are used to calculate the PDL.

Figure 8:
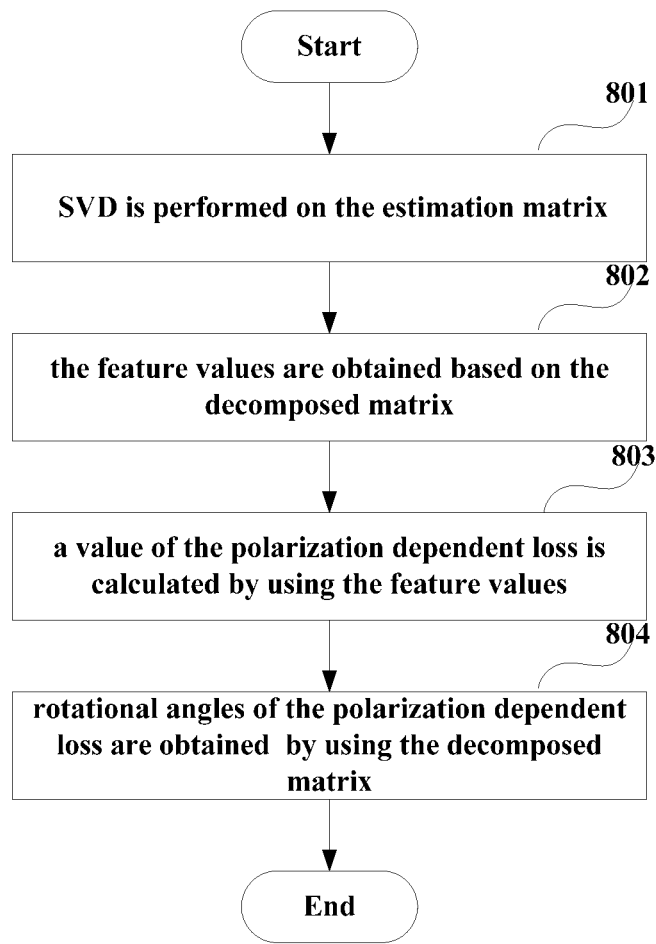
FIG. 8 is a schematic diagram of acquiring polarization dependent loss of Embodiment 1 of this disclosure.

FIG. 8 is a schematic diagram of acquiring the polarization dependent loss of the embodiment of this disclosure. As shown in FIG. 8, a process for acquiring the PDL may include:

bock 801: SVD is performed on the estimation matrix;

for example, the estimation matrix may be expressed as follows after SVD is performed:

$$A = U \times S \times V^T \quad \text{formula 14;}$$

where, A is the estimation matrix; hence, U is a 2×2 unitary matrix, S is a 2×2 diagonal matrix, and V is a 2×2 unitary matrix;

bock 802: the feature values are obtained based on the decomposed matrix;

for example, after comparing formulae 3 and 14, matrix U represents Rotator 2, matrix V represents Rotator 1, and matrix S represents a PDL matrix; and elements in diagonal of matrix S respectively represent power gains in the H polarization state and the V polarization state; hence, the elements in the diagonal of matrix S may be taken as the feature values of the estimation matrix;

bock 803: a value of the polarization dependent loss is calculated by using the feature values;

for example, the value of the polarization dependent loss is obtained by using a ratio of the elements in the diagonal of matrix S;

bock 804: rotational angles of the polarization dependent loss are obtained by using the decomposed matrix;

for example, a second rotational angle $\theta_2$ of the PDL is obtained based on the matrix U, and a first rotational angle $\theta_1$ of the PDL is obtained based on the matrix V.

The above description is given by taking the SVD as an example only. However, this disclosure is not limited thereto; for example, other matrix decomposition methods may also be used. In addition, related techniques may be referred to for particular contents of the SVD.

It should be noted that the above drawings only illustrate the embodiment of this disclosure. However, this disclosure is not limited thereto; for example, an order of executing the steps may be appropriately adjusted, and one or more steps therein may be added or deleted. And modifications may be properly made by those skilled in the art, without being limited to those contained in the above drawings.

The steps or processes related to this disclosure are only described above; however, this disclosure is not limited thereto. The method for estimating the PDL may include other steps or processes, and the prior art may be referred to for particular contents of these steps or processes.

It can be seen from the above embodiment that at a receiver, correlation operations are performed on the equalized dual-polarization state signals and unequalized dual-polarization state signals, and an estimation matrix is constructed based on a result of the correlation operations. Hence, not only PDL in an optical fiber link may be accurately estimated, but also off-line digital signal processing may be performed at the receiver, without needing to incur extra hardware overhead.

Embodiment 2

The embodiment of this disclosure provides an apparatus for estimating polarization dependent loss, configured in a receiving device receiving dual-polarization state signals. The embodiment of this disclosure corresponds to the method for estimating of Embodiment 1, with identical contents being not going to be described herein any further.

Figure 9:
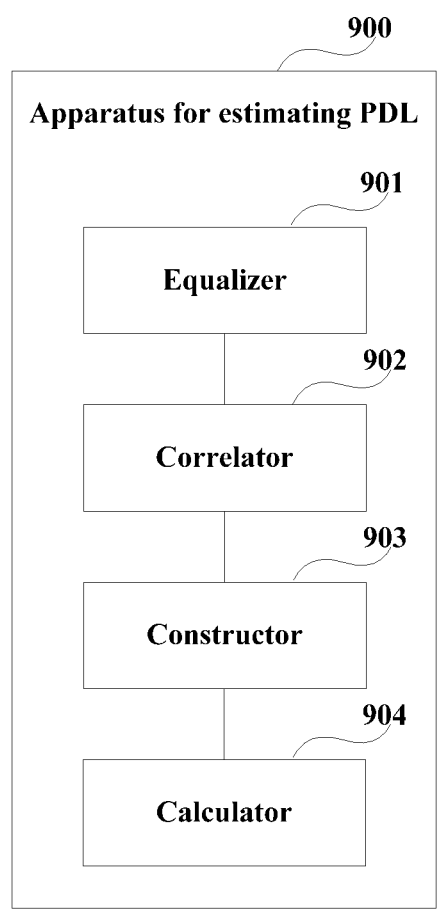
FIG. 9 is a schematic diagram of the apparatus for estimating polarization dependent loss of Embodiment 2 of this disclosure.

FIG. 9 is a schematic diagram of the apparatus for estimating polarization dependent loss of the embodiment of this disclosure. As shown in FIG. 9, the apparatus 900 for estimating polarization dependent loss includes:

an equalizer 901 configured to perform equalization processing on pre-processed dual-polarization state signals;

a correlator 902 configured to perform correlation operations on the equalized dual-polarization state signals and unequalized dual-polarization state signals;

a constructor 903 configured to construct an estimation matrix based on a result of the correlation operations; and a calculator 904 configured to calculate a polarization dependent loss of the dual-polarization state signals by using one or more feature values of the estimation matrix. In this embodiment, the correlator 902 may be configured to: perform inter-correlation operations on the equalized H-polarization state signals and unequalized H-polarization state signals; perform inter-correlation operations on the equalized H-polarization state signals and unequalized V-polarization state signals; perform inter-correlation operations on the equalized V-polarization state signals and unequalized H-polarization state signals; and perform inter-correlation operations on the equalized V-polarization state signals and unequalized V-polarization state signals.

Figure 10:
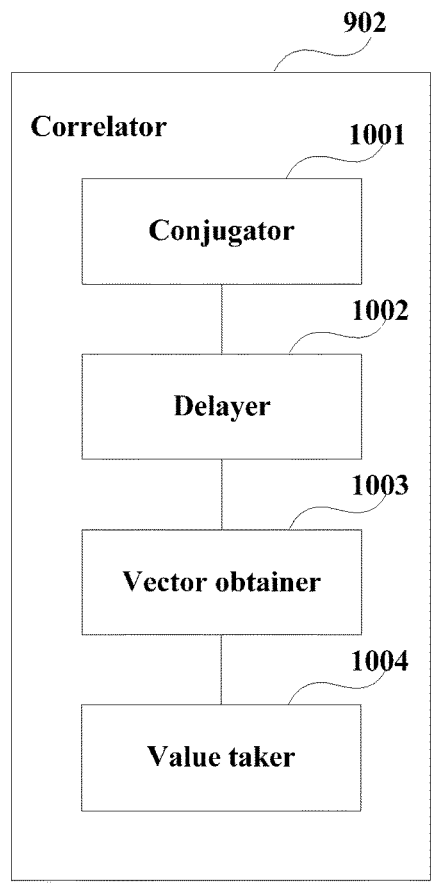
FIG. 10 is a schematic diagram of a correlator of Embodiment 2 of this disclosure.

FIG. 10 is a schematic diagram of the correlator of the embodiment of this disclosure. As shown in FIG. 10, the correlator 902 may include:

a conjugator 1001 configured to, for each inter-correlation operation, conjugate a route of signals performing the inter-correlation operation;

a delayer 1002 configured to perform delay on another route of signals performing the inter-correlation operation; and a vector obtainer 1003 configured to multiply the delayed signals by the conjugated signals, and take an expected value of a result of multiplication, so as to obtain a correlation value vector.

The conjugator 1001, the delayer 1002 and the vector obtainer 1003 may process for each inter-correlation operation, and each inter-correlation operation may obtain a correlation value vector.

As shown in FIG. 10, the correlator 902 may further include:

a value taker 1004 configured to determine a position of a maximum modulus value in the correlation value vector, and obtain a correlation value to which the position of the maximum modulus value corresponds.

Hence, in performing delay processing, corresponding correlation values may respectively be calculated for multiple (such as 4) correlation value vectors, and multiple (such as 4) corresponding correlation values may be obtained.

Figure 11:
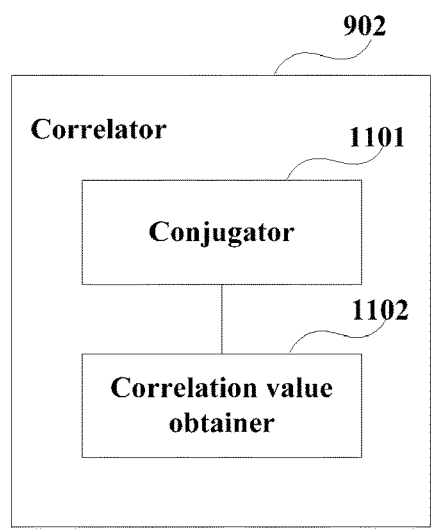
FIG. 11 is another schematic diagram of the correlator of Embodiment 2 of this disclosure.

FIG. 11 is another schematic diagram of the correlator of the embodiment of this disclosure. As shown in FIG. 11, the correlator 902 may include:

a conjugator 1101 configured to, for each inter-correlation operation, conjugate a route of signals performing the inter-correlation operation; and a correlation value obtainer 1102 configured to multiply two routes of signals performing the inter-correlation operation after aligning them, and take an expected value of a result of multiplication, so as to obtain a correlation value.

Here, in a case where no delay processing is performed, corresponding correlation values (such as 4 values) may be calculated respectively.

In this embodiment, the estimation matrix constructed by the constructor 903 based on the result of the correlation operation may be expressed as follows:

$$A = \begin{bmatrix} M_1 & M_2 \\ M_3 & M_4 \end{bmatrix}$$

where, A is the estimation matrix;

$M_1$ is a correlation value to which a position of a maximum modulus value in a correlation value vector obtained after the inter-correlation operations are performed on the equalized H-polarization state signals and the unequalized H-polarization state signals corresponds, or is a correlation value obtained after the inter-correlation operations are performed on the equalized H-polarization state signals and the unequalized H-polarization state signals;

$M_2$ is a correlation value to which a position of a maximum modulus value in a correlation value vector obtained after the inter-correlation operations are performed on the equalized V-polarization state signals and the unequalized H-polarization state signals corresponds, or is a correlation value obtained after the inter-correlation operations are performed on the equalized V-polarization state signals and the unequalized H-polarization state signals;

$M_3$ is a correlation value to which a position of a maximum modulus value in a correlation value vector obtained after the inter-correlation operations are performed on the equalized H-polarization state signals and the unequalized V-polarization state signals corresponds, or is a correlation value obtained after the inter-correlation operations are performed on the equalized H-polarization state signals and the unequalized V-polarization state signals;

and $M_4$ is a correlation value to which a position of a maximum modulus value in a correlation value vector obtained after the inter-correlation operations are performed on the equalized V-polarization state signals and the unequalized V-polarization state signals corresponds, or is a correlation value obtained after the inter-correlation operations are performed on the equalized H-polarization state signals and the unequalized V-polarization state signals.

Figure 12:
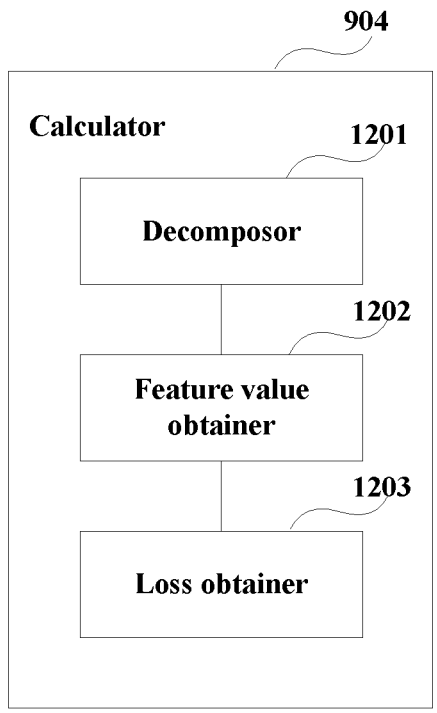
FIG. 12 is a schematic diagram of a calculator of Embodiment 2 of this disclosure.

FIG. 12 is a schematic diagram of the calculator of the embodiment of this disclosure. As shown in FIG. 12, the calculator 904 may include:

a decomposer 1201 configured to perform singular value decomposition (SVD) on the estimation matrix;

a feature value obtainer 1202 configured to obtain the feature values based on the decomposed matrix; and a loss obtainer 1203 configured to calculate a value of the polarization dependent loss by using the feature values, and obtain rotational angles of the polarization dependent loss by using the decomposed matrix.

In this embodiment, the singular value decomposed estimation matrix may be expressed as follows:

$$A = U \times S \times V^T;$$

where, A is the estimation matrix, U is a 2×2 unitary matrix, S is a 2×2 diagonal matrix, and V is a 2×2 unitary matrix.

The feature value obtainer 1202 may be configured to take elements in a diagonal of the matrix S as the feature values of the estimation matrix, and the loss obtainer 1203 may further be configured to obtain the value of the polarization dependent loss based on a ratio of elements in a diagonal of the matrix S, and respectively obtain a first rotational angle and a second rotational angle of the polarization dependent loss based on the matrix V and the matrix U.

It should be noted that the components related to this disclosure are only described above; however, this disclosure is not limited thereto. The apparatus for estimating the PDL may include other components or modules, and the relevant art may be referred to for particular contents of these components or modules.

It can be seen from the above embodiment that at a receiver, correlation operations are performed on the equalized dual-polarization state signals and unequalized dual-polarization state signals, and an estimation matrix is constructed based on a result of the correlation operations. Hence, not only PDL in an optical fiber link may be accurately estimated, but also off-line digital signal processing may be performed at the receiver, without needing to incur extra hardware overhead.

Embodiment 3

The embodiment of this disclosure provides a receiving device, which may be configured with the apparatus 900 for estimating PDL, with contents identical to those in embodiments 1 and 2 being not going to be described herein any further.

Figure 13:
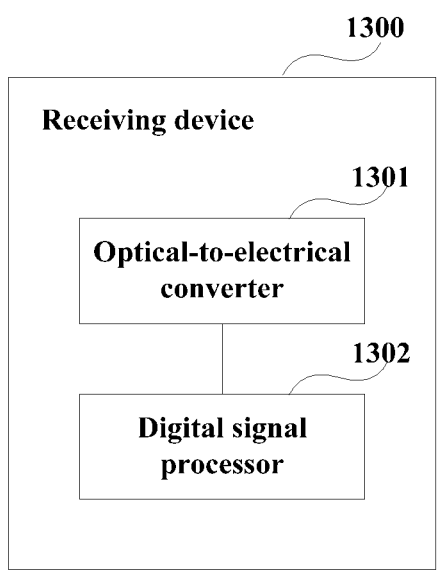
FIG. 13 is a schematic diagram of the receiving device of Embodiment 3 of this disclosure.

FIG. 13 is a schematic diagram of the receiving device of the embodiment of this disclosure. As shown in FIG. 13, the receiving device 1300 may include:

an optical-to-electrical converter 1301 configured to convert received dual-polarization state optical signals into electrical signals; and a digital signal processor 1302 configured to perform equalization processing on pre-processed dual-polarization state signals, perform correlation operations on the equalized dual-polarization state signals and unequalized dual-polarization state signals, construct an estimation matrix based on a result of the correlation operations, and calculate a polarization dependent loss of the dual-polarization state signals by using one or more feature values of the estimation matrix.

In this embodiment, the digital signal processor 1302 may use a DSP technique to achieve the above functions/operations. It should be noted that only those components related to this disclosure are shown in FIG. 13; however, this disclosure is not limited thereto. Related techniques may be referred to for other components of the receiving device, which shall not be described herein any further.

Figure 14:
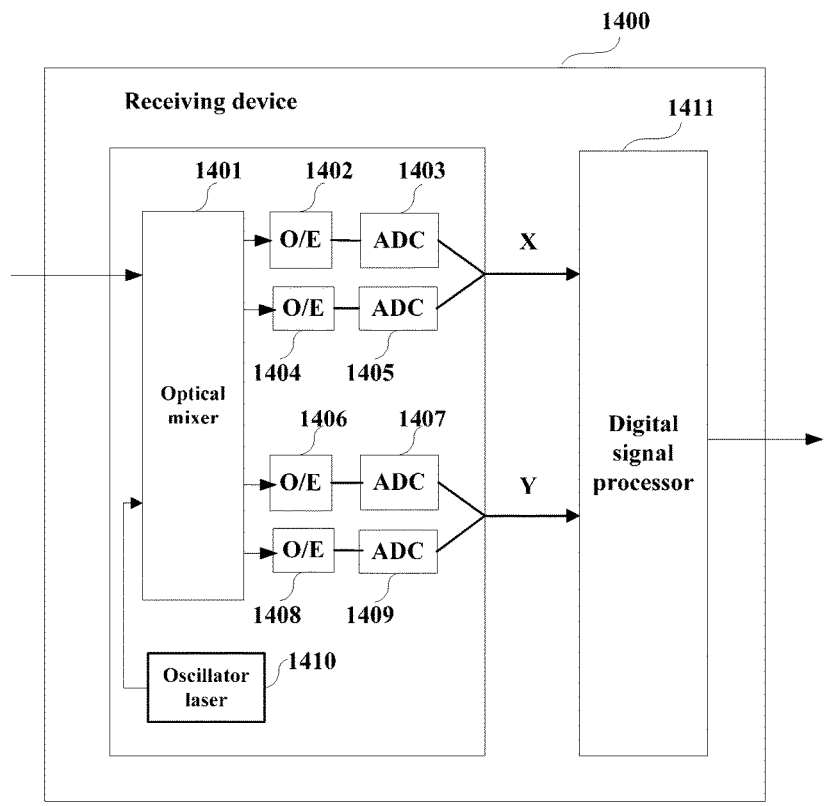
FIG. 14 is another schematic diagram of the receiving device of Embodiment 3 of this disclosure.

FIG. 14 is another schematic diagram of the receiving device of the embodiment of this disclosure, which is described by taking dual polarization states as examples. As shown in FIG. 14, the receiving device 1400 includes an oscillator laser 1410, an optical mixer 1401, opto-electronic (O/E) detectors 1402, 1404, 1406 and 1408, analog-to-digital converters (ADCs) 1403, 1405, 1407 and 1409, and a digital signal processor 1411.

The digital signal processor 1411 may execute the function of the digital signal processor 1302, that is, it may be controlled to carry out the method for estimating PDL described in Embodiment 1, which shall not be described herein any further.

The oscillator laser 1410 is configured to provide a local light source; an optical signal is converted into a baseband signal in one polarization state after passing through the optical mixer 1401, the opto-electronic (O/E) detectors 1402 and 1404 and the analog-to-digital converters (ADCs) 1403 and 1405; and the optical signal is converted into a baseband signal in the other polarization state after passing through the optical mixer 1401, the opto-electronic (O/E) detectors 1406 and 1408 and the analog-to-digital converters (ADCs) 1407 and 1409, with a detailed process being similar to that in the relevant art, and being not going to be described herein any further.

Furthermore, the receiving device 1400 may further include a dispersion compensator (not shown in FIG. 14). etc. If a frequency difference and a phase noise have effect on estimation of an optical signal to noise ratio (OSNR), the receiving device 1400 may further include a frequency difference compensator and a phase noise compensator (not shown in FIG. 14).

It should be noted that the receiving device of this disclosure is illustrated in FIG. 14 only; however, this disclosure is not limited thereto. And the receiving device 1400 does not necessarily include all the components shown in FIG. 14, and furthermore, the receiving device 1400 may include components not shown in FIG. 14, and the relevant art may be referred to.

The embodiment of this disclosure further provides an optical communication system.

Figure 15:
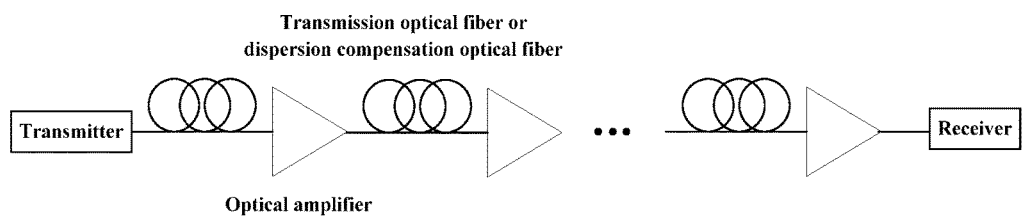
FIG. 15 is a schematic diagram of the optical communication system of Embodiment 3 of this disclosure.

FIG. 15 is a schematic diagram of the optical communication system of the embodiment of this disclosure. As shown in FIG. 15, a signal transmitted by a transmitter may reach a receiver after passing different devices in a transmission link (such as an optical fiber, an optical amplifier, and a dispersion compensation optical fiber, etc.). The receiver includes the digital signal processor 1302 described above.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The method/apparatus described with reference to the embodiments of this disclosure may be directly embodied as hardware, software modules executed by a processor, or a combination thereof. For example, one or more functional block diagrams and/or one or more combinations of the functional block diagrams shown in FIG. 9 (such as equalizer and correlator, and so on) may either correspond to software modules of procedures of a computer program, or correspond to hardware modules. Such software modules may respectively correspond to the steps shown in FIG. 2. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

For implementations of the present disclosure containing the above embodiments, following supplements are further disclosed.

Supplement 1.

An apparatus for estimating polarization dependent loss, configured in a receiving device receiving dual-polarization state signals, the apparatus including:

an equalizer configured to perform equalization processing on pre-processed dual-polarization state signals;

a correlator configured to perform correlation operations on the equalized dual-polarization state signals and unequalized dual-polarization state signals;

a constructor configured to construct an estimation matrix based on a result of the correlation operations; and a calculator configured to calculate a polarization dependent loss of the dual-polarization state signals by using one or more feature values of the estimation matrix.

Supplement 2.

The apparatus according to supplement 1, wherein the correlator is configured to:

perform inter-correlation operations on the equalized H-polarization state signals and unequalized H-polarization state signals;

perform inter-correlation operations on the equalized H-polarization state signals and unequalized V-polarization state signals;

perform inter-correlation operations on the equalized V-polarization state signals and unequalized H-polarization state signals; and perform inter-correlation operations on the equalized V-polarization state signals and unequalized V-polarization state signals.

Supplement 3.

The apparatus according to supplement 2, wherein the correlator includes:

a conjugator configured to, for each inter-correlation operation, conjugate a route of signals performing the inter-correlation operation;

a delayer configured to perform delay on another route of signals performing the inter-correlation operation;

a vector obtainer configured to multiply the delayed signals by the conjugated signals, and take an expected value of a result of multiplication, so as to obtain a correlation value vector; and a value taker configured to determine a position of a maximum modulus value in the correlation value vector, and obtain a correlation value to which the position of the maximum modulus value corresponds.

Supplement 4.

The apparatus according to supplement 2, wherein the correlator includes:

a conjugator configured to, for each inter-correlation operation, conjugate a route of signals performing the inter-correlation operation; and a correlation value obtainer configured to multiply two routes of signals performing the inter-correlation operation after aligning them, and take an expected value of a result of multiplication, so as to obtain a correlation value.

Supplement 5.

The apparatus according to supplement 1, wherein the estimation matrix constructed by the constructor based on the result of the correlation operation is expressed as follows:

$$A = \begin{bmatrix} M_1 & M_2 \\ M_3 & M_4 \end{bmatrix}$$

where, A is the estimation matrix;

$M_1$ is a correlation value to which a position of a maximum modulus value in a correlation value vector obtained after the inter-correlation operations are performed on the equalized H-polarization state signals and the unequalized H-polarization state signals corresponds, or is a correlation value obtained after the inter-correlation operations are performed on the equalized H-polarization state signals and the unequalized H-polarization state signals;

$M_2$ is a correlation value to which a position of a maximum modulus value in a correlation value vector obtained after the inter-correlation operations are performed on the equalized V-polarization state signals and the unequalized H-polarization state signals corresponds, or is a correlation value obtained after the inter-correlation operations are performed on the equalized V-polarization state signals and the unequalized H-polarization state signals;

$M_3$ is a correlation value to which a position of a maximum modulus value in a correlation value vector obtained after the inter-correlation operations are performed on the equalized H-polarization state signals and the unequalized V-polarization state signals corresponds, or is a correlation value obtained after the inter-correlation operations are performed on the equalized H-polarization state signals and the unequalized V-polarization state signals;

and $M_4$ is a correlation value to which a position of a maximum modulus value in a correlation value vector obtained after the inter-correlation operations are performed on the equalized V-polarization state signals and the unequalized V-polarization state signals corresponds, or is a correlation value obtained after the inter-correlation operations are performed on the equalized H-polarization state signals and the unequalized V-polarization state signals.

Supplement 6.

The apparatus according to supplement 1, wherein the calculator includes:

a singular value decomposer configured to perform singular value decomposition on the estimation matrix;

a feature value obtainer configured to obtain the feature values based on the decomposed matrix; and a loss obtainer configured to calculate a value of the polarization dependent loss by using the feature values, and obtain rotational angles of the polarization dependent loss by using the decomposed matrix.

Supplement 7.

The apparatus according to supplement 6, wherein the singular value decomposed estimation matrix is expressed as follows:

$$A = U \times S \times V^T;$$

where, A is the estimation matrix, U is a 2×2 unitary matrix, S is a 2×2 diagonal matrix, and V is a 2×2 unitary matrix.

Supplement 8.

The apparatus according to supplement 7, wherein the feature value obtainer is configured to: take elements in a diagonal of the matrix S as the feature values of the estimation matrix.

Supplement 9.

The apparatus according to supplement 7, wherein the loss obtainer is further configured to: obtain the value of the polarization dependent loss based on a ratio of elements in a diagonal of the matrix S, and respectively obtain a first rotational angle and a second rotational angle of the polarization dependent loss based on the matrix V and the matrix U.

Supplement 10.

A method for estimating polarization dependent loss, applicable to a receiving device receiving dual-polarization state signals, the method including:

performing equalization processing on pre-processed dual-polarization state signals;

performing correlation operations on the equalized dual-polarization state signals and unequalized dual-polarization state signals;

constructing an estimation matrix based on a result of the correlation operations; and calculating a polarization dependent loss of the dual-polarization state signals by using one or more feature values of the estimation matrix.

Supplement 11.

The method according to supplement 10, wherein the performing correlation operations on the equalized dual-polarization state signals and unequalized dual-polarization state signals includes:

performing inter-correlation operations on the equalized H-polarization state signals and unequalized H-polarization state signals;

performing inter-correlation operations on the equalized H-polarization state signals and unequalized V-polarization state signals;

performing inter-correlation operations on the equalized V-polarization state signals and unequalized H-polarization state signals; and performing inter-correlation operations on the equalized V-polarization state signals and unequalized V-polarization state signals.

Supplement 12.

The method according to supplement 11, wherein each inter-correlation operation includes:

conjugating a route of signals performing the inter-correlation operation;

performing delay on another route of signals performing the inter-correlation operation;

multiplying the delayed signals by the conjugated signals, and taking an expected value of a result of multiplication, so as to obtain a correlation value vector; and determining a position of a maximum modulus value in the correlation value vector, and obtaining a correlation value to which the position of the maximum modulus value corresponds.

Supplement 13.

The method according to supplement 11, wherein each inter-correlation operation includes:

conjugating a route of signals performing the inter-correlation operation; and multiplying two routes of signals performing the inter-correlation operation after aligning them, and taking an expected value of a result of multiplication, so as to obtain a correlation value.

Supplement 14.

The method according to supplement 10, wherein the estimation matrix constructed based on the result of the correlation operation is expressed as follows:

$$A = \begin{bmatrix} M_1 & M_2 \\ M_3 & M_4 \end{bmatrix}$$

where, A is the estimation matrix;

$M_1$ is a correlation value to which a position of a maximum modulus value in a correlation value vector obtained after the inter-correlation operations are performed on the equalized H-polarization state signals and the unequalized H-polarization state signals corresponds, or is a correlation value obtained after the inter-correlation operations are performed on the equalized H-polarization state signals and the unequalized H-polarization state signals;

$M_2$ is a correlation value to which a position of a maximum modulus value in a correlation value vector obtained after the inter-correlation operations are performed on the equalized V-polarization state signals and the unequalized H-polarization state signals corresponds, or is a correlation value obtained after the inter-correlation operations are performed on the equalized V-polarization state signals and the unequalized H-polarization state signals;

$M_3$ is a correlation value to which a position of a maximum modulus value in a correlation value vector obtained after the inter-correlation operations are performed on the equalized H-polarization state signals and the unequalized V-polarization state signals corresponds, or is a correlation value obtained after the inter-correlation operations are performed on the equalized H-polarization state signals and the unequalized V-polarization state signals;

and $M_4$ is a correlation value to which a position of a maximum modulus value in a correlation value vector obtained after the inter-correlation operations are performed on the equalized V-polarization state signals and the unequalized V-polarization state signals corresponds, or is a correlation value obtained after the inter-correlation operations are performed on the equalized H-polarization state signals and the unequalized V-polarization state signals.

Supplement 15.

The method according to supplement 10, wherein the calculating a polarization dependent loss of the dual-polarization state signals by using one or more feature values of the estimation matrix includes:

performing singular value decomposition on the estimation matrix;

obtaining the feature values based on the decomposed matrix; and calculating a value of the polarization dependent loss by using the feature values, and obtain rotational angles of the polarization dependent loss by using the decomposed matrix.

Supplement 16.

The method according to supplement 15, wherein the singular value decomposed estimation matrix is expressed as follows:

$$A = U \times S \times V^T;$$

where, A is the estimation matrix, U is a 2×2 unitary matrix, S is a 2×2 diagonal matrix, and V is a 2×2 unitary matrix.

Supplement 17.

The method according to supplement 16, wherein elements in a diagonal of the matrix S are taken as the feature values of the estimation matrix.

Supplement 18.

The method according to supplement 16, wherein the value of the polarization dependent loss is obtained based on a ratio of elements in a diagonal of the matrix S, and a first rotational angle and a second rotational angle of the polarization dependent loss are respectively obtained based on the matrix V and the matrix U.

19. A receiving device, including:

an optical-to-electrical converter configured to convert received dual-polarization state optical signals into electrical signals; and a digital signal processor configured to perform equalization processing on pre-processed dual-polarization state signals, perform correlation operations on the equalized dual-polarization state signals and unequalized dual-polarization state signals, construct an estimation matrix based on a result of the correlation operations, and calculate a polarization dependent loss of the dual-polarization state signals by using feature values of the estimation matrix.

The invention claimed is:

1. An apparatus for estimating polarization dependent loss, configured in a receiving device receiving dual-polarization state signals, the apparatus comprising:
an equalizer configured to perform equalization processing on pre-processed dual-polarization state signals;
a correlator configured to perform correlation operations on the equalized dual-polarization state signals and unequalized dual-polarization state signals;
a constructor configured to construct an estimation matrix based on a result of the correlation operations; and
a calculator configured to calculate a polarization dependent loss of the dual-polarization state signals by using one or more feature values of the estimation matrix,
wherein the correlator is configured to:
perform inter-correlation operations on the equalized H-polarization state signals and unequalized H-polarization state signals;
perform inter-correlation operations on the equalized H-polarization state signals and unequalized V-polarization state signals;
perform inter-correlation operations on the equalized V-polarization state signals and unequalized H-polarization state signals; and
perform inter-correlation operations on the equalized V-polarization state signals and unequalized V-polarization state signals.

2. The apparatus according to claim 1, wherein the correlator comprises:
a conjugator configured to, for each inter-correlation operation, conjugate a route of signals performing the inter-correlation operation;
a delayer configured to perform delay on another route of signals performing the inter-correlation operation;
a vector obtainer configured to multiply the delayed signals by the conjugated signals, and take an expected value of a result of multiplication, so as to obtain a correlation value vector; and
a value taker configured to determine a position of a maximum modulus value in the correlation value vector, and obtain a correlation value to which the position of the maximum modulus value corresponds.

3. The apparatus according to claim 1, wherein the correlator comprises:
a conjugator configured to, for each inter-correlation operation, conjugate a route of signals performing the inter-correlation operation; and
a correlation value obtainer configured to multiply two routes of signals performing the inter-correlation operation after aligning them, and take an expected value of a result of multiplication, so as to obtain a correlation value.

4. The apparatus according to claim 1, wherein the estimation matrix constructed by the constructor based on the result of the correlation operation is expressed as follows:

$$A = \begin{bmatrix} M_1 & M_2 \\ M_3 & M_4 \end{bmatrix}$$

where, A is the estimation matrix;
$M_1$ is a correlation value to which a position of a maximum modulus value in a correlation value vector obtained after the inter-correlation operations are performed on the equalized H-polarization state signals and the unequalized H-polarization state signals corresponds, or is a correlation value obtained after the inter-correlation operations are performed on the equalized H-polarization state signals and the unequalized H-polarization state signals;
$M_2$ is a correlation value to which a position of a maximum modulus value in a correlation value vector obtained after the inter-correlation operations are performed on the equalized V-polarization state signals and the unequalized H-polarization state signals corresponds, or is a correlation value obtained after the inter-correlation operations are performed on the equalized V-polarization state signals and the unequalized H-polarization state signals;
$M_3$ is a correlation value to which a position of a maximum modulus value in a correlation value vector obtained after the inter-correlation operations are performed on the equalized H-polarization state signals and the unequalized V-polarization state signals corresponds, or is a correlation value obtained after the inter-correlation operations are performed on the equalized H-polarization state signals and the unequalized V-polarization state signals;
and $M_4$ is a correlation value to which a position of a maximum modulus value in a correlation value vector obtained after the inter-correlation operations are performed on the equalized V-polarization state signals and the unequalized V-polarization state signals corresponds, or is a correlation value obtained after the inter-correlation operations are performed on the equalized H-polarization state signals and the unequalized V-polarization state signals.

5. The apparatus according to claim 1, wherein the calculator comprises:
a singular value decomposer configured to perform singular value decomposition on the estimation matrix;
a feature value obtainer configured to obtain the feature values based on the decomposed matrix; and
a loss obtainer configured to calculate a value of the polarization dependent loss by using the feature values, and obtain rotational angles of the polarization dependent loss by using the decomposed matrix.

6. The apparatus according to claim 5, wherein the singular value decomposed estimation matrix is expressed as follows:
$A = U \times S \times V^T$;
where, A is the estimation matrix, U is a 2×2 unitary matrix, S is a 2×2 diagonal matrix, and V is a 2×2 unitary matrix.

7. The apparatus according to claim 6, wherein the loss obtainer is further configured to: obtain the value of the polarization dependent loss based on a ratio of elements in a diagonal of the matrix S, and respectively obtain a first rotational angle and a second rotational angle of the polarization dependent loss based on the matrix V and the matrix U.

8. A method for estimating polarization dependent loss, applicable to a receiving device receiving dual-polarization state signals, the method comprising:
- performing equalization processing on pre-processed dual-polarization state signals;
- performing correlation operations on the equalized dual-polarization state signals and unequalized dual-polarization state signals;
- constructing an estimation matrix based on a result of the correlation operations; and
- calculating a polarization dependent loss of the dual-polarization state signals by using one or more feature values of the estimation matrix, wherein the performing correlation operations on the equalized dual-polarization state signals and unequalized dual-polarization state signals comprising:
- performing inter-correlation operations on the equalized H-polarization state signals and unequalized H-polarization state signals;
- performing inter-correlation operations on the equalized H-polarization state signals and unequalized V-polarization state signals;
- performing inter-correlation operations on the equalized V-polarization state signals and unequalized H-polarization state signals; and
- performing inter-correlation operations on the equalized V-polarization state signals and unequalized V-polarization state signals.

9. A receiving device, comprising:
- an optical-to-electrical converter configured to convert received dual-polarization state optical signals into electrical signals; and
- a digital signal processor configured to perform equalization processing on pre-processed dual-polarization state signals, perform correlation operations on the equalized dual-polarization state signals and unequalized dual-polarization state signals, construct an estimation matrix based on a result of the correlation operations, and calculate a polarization dependent loss of the dual-polarization state signals by using one or more feature values of the estimation matrix, wherein the digital signal processor performs correlation operations on the equalized dual-polarization state signals and unequalized dual-polarization state signals by configured to perform inter-correlation operations on the equalized H-polarization state signals and unequalized H-polarization state signals; perform inter-correlation operations on the equalized H-polarization state signals and unequalized V-polarization state signals; perform inter-correlation operations on the equalized V-polarization state signals and unequalized H-polarization state signals; and perform inter-correlation operations on the equalized V-polarization state signals and unequalized V-polarization state signals.

* * * * *